United States Patent [19]

Jamieson

[11] 4,382,655
[45] May 10, 1983

[54] AT GRADE OPTICAL CROSSOVER FOR MONOLITHIC OPTIAL CIRCUITS

[75] Inventor: Robert S. Jamieson, Los Angeles, Calif.

[73] Assignee: California Institute of Technology, Pasadena, Calif.

[21] Appl. No.: 138,164

[22] Filed: Apr. 7, 1980

[51] Int. Cl.³ .............................................. G02B 5/174
[52] U.S. Cl. ............................... 350/96.12; 350/96.15
[58] Field of Search ............... 350/96.11, 96.12, 96.13, 350/96.15

[56] References Cited

U.S. PATENT DOCUMENTS

| | | | |
|---|---|---|---|
| 3,558,213 | 1/1971 | Marcatili | 350/96.12 |
| 3,662,830 | 5/1972 | Martin | 166/293 |
| 3,663,194 | 5/1972 | Greenstein et al. | 65/43 |
| 3,767,445 | 10/1973 | Chandross et al. | 427/54.1 |
| 3,809,732 | 5/1974 | Chandross et al. | 264/22 |
| 3,953,620 | 4/1976 | Chandross et al. | 427/53.1 |
| 4,019,051 | 4/1977 | Miller | 350/96.15 X |
| 4,130,342 | 12/1978 | McMahon | 350/96.13 X |

OTHER PUBLICATIONS

Rodriguez, "Fast DMOS Optocouplers Beat SSRs in Speed and Reed Relays in Performance", *Electronic Design*, vol. 28, No. 7, Mar. 1980, pp. 60–63.

*Primary Examiner*—John D. Lee
*Attorney, Agent, or Firm*—Freilich, Hornbaker, Wasserman, Rosen & Fernandez

[57] ABSTRACT

Planar optical circuits may be made to cross through each other, (thus eliminating extra steps required to fabricate elevated, nonintersecting crossovers) by control of the dimensions of the crossing light conductors (10, 12) to be significantly greater than $d=0.89\lambda$ and the angle of crossing as nearly 90° as conveniently possible. A light trap may be provided just ahead of the intersection to trap any light being reflected in the source conductor at angles greater than about 45°. The light trap may take the form of triangular shaped portions (16a, 16b) on each side of the source conductor with the far side of the triangular portion receiving incident light at an angle so that incident light will be reflected to the other side, or it may take the form of windows (18a, 18b) in place of the triangular portions. Planar optical circuit boards (21-23) may be fabricated and stacked to form a keyboard (20) with intersecting conductors (26-29) and "keyholes" (0-9) where conductors merge at the broad side of the circuit boards. These keyholes may be prearranged to form an array or matrix of keyholes.

5 Claims, 4 Drawing Figures

AT GRADE OPTICAL CROSSOVER FOR MONOLITHIC OPTIAL CIRCUITS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to monolithic optical circuits of the type disclosed in a copending application Ser. No. 138,165 filed Apr. 7, 1980 by Vincent L. Evanchuk (now abandoned), and more particularly to an improved way of providing crossing light conductors on the same grade or level.

It is usually impossible to design a circuit on a single plane on which all conductors can be kept separate, without intersecting or crossing over, especially when the circuit elements to be connected have a plurality of terminals. In electrical conductive printed circuits the necessary crossovers are fabricated by adding additional layers of circuitry and connections are made between layers by plating through drilled holes at appropriate points. In a monolithic optical circuit structure proposed by Vincent L. Evanchuk in the aforesaid copending application filed concurrently herewith, crossovers are fabricated by depositing additional layers of radiation sensitive plastic, exposing the plastic through a mask, and washing away the unexposed, uncatalyzed plastic-leaving elevated crossovers connected to conductors in lower layers. If even only one crossover on a monolithic optical circuit board is needed, two layers are required; then the number of process steps is roughly doubled. This has a direct effect on cost. In certain cases it would be desirable to eliminate the need for additional levels in providing a crossing between light conductors.

In the aforesaid Evanchuk application, a keyboard is fabricated by forming a monolithic plastic block with internal light conductors brought up through it to "keyholes" at the keyboard surface from light distribution conductors formed in a first level on a substrate. The illuminating light is brough up to each "keyhole" by a rising conductor illuminated through a source conductor to join a second rising conductor that connects with a sensing conductor; these rising conductors join at the keyboard surface in an inverted V to form the keyhole. The departure of the rising conductors from normal is less than the critical angle of refraction so that the illuminating light in one conductor passes out to the ambient atmosphere unless a finger or other reflecting object is placed directly on the keyhole to reflect the light beam back down into the sensing conductor.

To insure proper registration between the distribution circuit board and the rising conductors, and to insure a proper joining of the rising conductors, high precision is required. The angle of the irradiating beam used in fabricating the rising conductors must be very carefully controlled throughout the entire sequence of steps used in fabricating the plurality of rising conductors, as must its location at each exposure, since this is, in practice, a step-by-step operation of one exposure per rising conductor. Manufacture would be slow and costly. This would be especially true in any application which requires a large number of illumination points, such as a large keyboard with a mosaic of hundreds of keyholes to be used for various purposes.

An object of this invention is to fabricate monolithic optical circuit boards in layers that are perpendicular to its upper surface, each layer containing a plurality of keyholes illuminated from source light entering at one end through a conductor that branches.

SUMMARY OF THE INVENTION

In accordance with the present invention, optical paths in monolithic optical circuits fabricated in accordance with the teachings of the aforesaid application by Vincent L. Evanchuk may be made to cross through each other, thus eliminating extra steps required to fabricate elevated, nonintersecting crossovers. This is accomplished by control of the dimensions of the crossing light conductors and of the crossing angle. The dimensions are controlled to be significantly greater than the dimension $d = 0.89\lambda$ at which diffraction may begin to take place where a light conductor is open like a slit at the point of intercepting the crossing conductor. And the angle of interception is controlled to be as nearly 90° as conveniently possible. To further reduce any leakage (crosstalk) of light from one conductor into the other intersecting conductor, a light trap may be provided just ahead of the intersection to trap any light being reflected in the source conductor at large angles, i.e., angles greater than about 45°. The light trap may take the form of a triangular shaped portion on each side of the source conductor wherein the far side of the triangular portion receiving incident light from the source conductor is at an angle equal to or less than 45° so that the incident light will be reflected to the other side. What would be the third side of the triangle is a window for light at large angles of reflection to be passed into the triangular shaped trap. Alternatively, the trap may be simply windows on the sides of the source conductor just ahead of the intersecting conductor. Monolithic optical circuits can be produced with or without intersecting conductors and traps, but with "keyholes" comprised of conductors merging at one side at less than a critical angle of refraction with the surface of the side. These monolithic optical circuits can then be stacked to form a numerical keyboard, or any mosaic or array of keyholes required with optical circuits for coupling to source and sense devices.

The novel features that are considered characteristic of this invention are set forth with particularly in the appended claims. The invention will best be understood from the following description when read in connection with the accompanying drawings.

DESCRIPTION OF PREFERRED EMBODIMENTS

Figure 1:
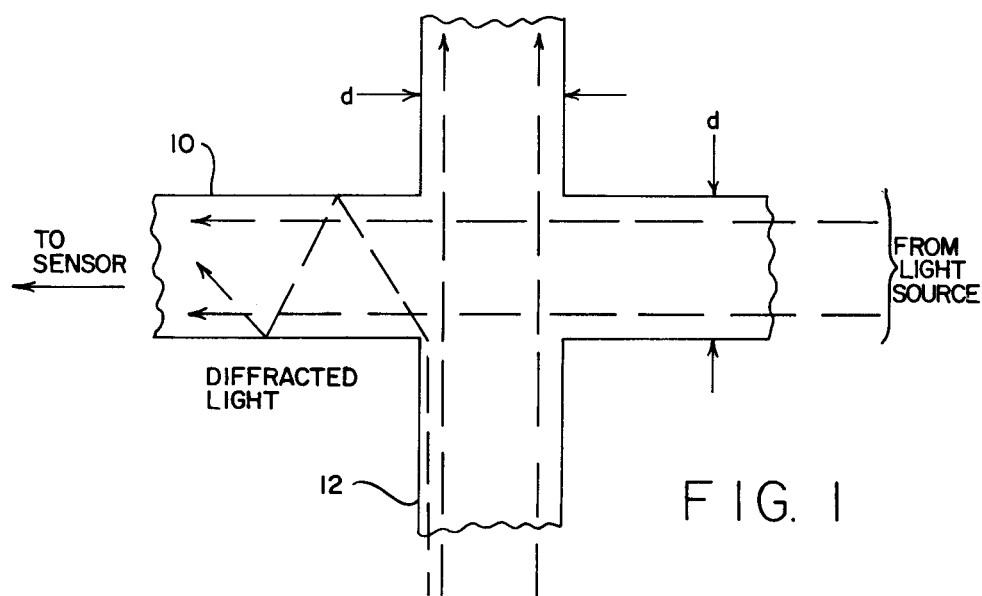
FIG. 1 is a schematic diagram illustrating two optical conductors intersecting each other in accordance with the present invention.

FIG. 1 shows a typical planar crossover of two conductors 10 and 12. The junction of the two light conductors is made at right angles; each beam of light from a source passes through the other. If both light beams were traveling in straight lines along the axes of their respective conductors, the sensors in one path would not receive any light from the other.

If the conductor dimensions are small enough, the crossover would act as a slit and cause diffraction. This would result in spreading of the beam in dark and light bands against the far wall of the conductor crossing this beam at right angles. The light bands could be reflected off walls of the wrong conductor until they reach an unintended sensor, as shown by a dotted line for a diffracted light ray in FIG. 1. However, as demonstrated on page 363 of "Modern College Physics", by Harvey E. White, 4th Edition, published by D. Van Nostrand Co., Inc. 1963, choice of a sufficiently large dimension for the light conductors crossing will minimize diffraction of light.

Given d as the width of the slit (in this case the width of both conductors) diffraction will begin to occur only for values of d equal to or less than $2\lambda/\sqrt{5}=0.89\lambda$. Since the wavelengths involved are of the order of a fraction of a micrometer, the width d need by only a few micrometers to include all the significant light bands. Further, since practical limitations of the processes used in the aforesaid application by Evanchuk would normally yield conductor widths of at least 5 micrometers, it can be seen that diffraction is not likely to cause a problem for two conductors crossing through each other at right angles, especially if the light source is coherent.

Figure 2:
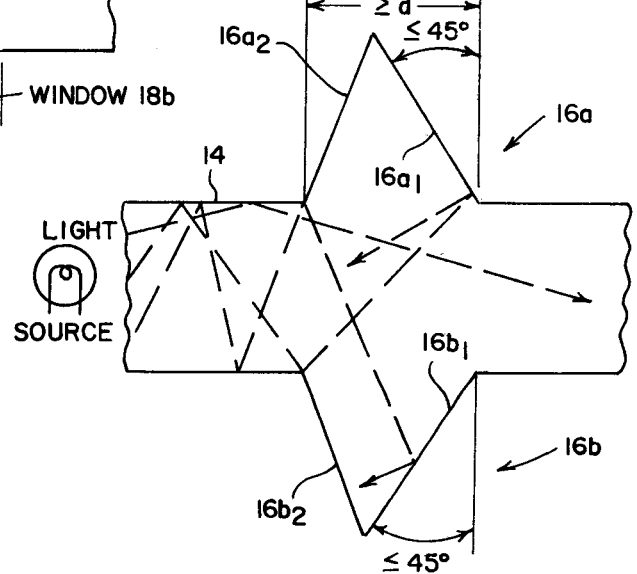
FIG. 2 illustrates one form of light trap that may be used with the intersecting conductors of FIG. 1.

Another possible source of crosstalk between light conductors which cross through each other at right angles may be from light which is reflected off the walls of the source conductor 14 at high angles, as shown by dotted lines in FIG. 2. This light would be attenuated by having to travel a longer total path, but it could still cause a problem in some cases. The cure for this source of crosstalk is to trap out light in the source conductor just ahead of the crossing conductor which is reflected at high angles. Two such traps 16a and 16b are shown in FIG. 2, both easily fabricated by the method of the aforesaid application by Evanchuk. If both conductors in the grade crossing are equal in width then it is necessary only to trap out light beams traveling at greater than 45° to the axis of the source conductor. By proper design of the trap lengths and the trap reflector angles all potential crosstalk signals can be removed, either before or after the crossover.

Figure 3:
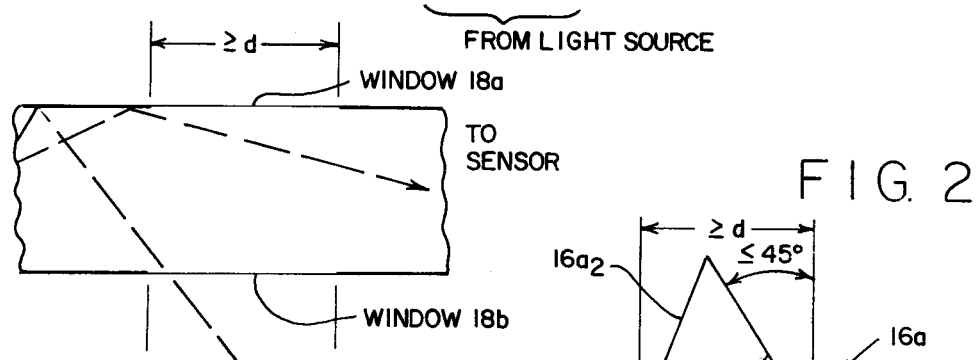
FIG. 3 illustrates another form of light trap that may be used with intersecting conductors of FIG. 1.

Obviously, the window traps 18a and 18b of FIG. 3 can only be used where ambient light is excluded, or is at such a low level that it will cause no problems. And, the medium outside the windows must be transparent and have an index of refraction higher than that of the conductor, or light striking if from inside at less than the critical angle will be reflected anyway. The two traps may be combined; that is, the walls $16a_1$, $16a_2$ and $16b_1$, $16b_2$ of the diamond trap need not be reflective, if ambient light is excluded. Hence some light will pass out through the walls, other light will be trapped. Thus the diamond trap can be used for conductors which are clad with a reflective surface or with a coat having a different index of refraction, even when that index is lower.

Figure 4:
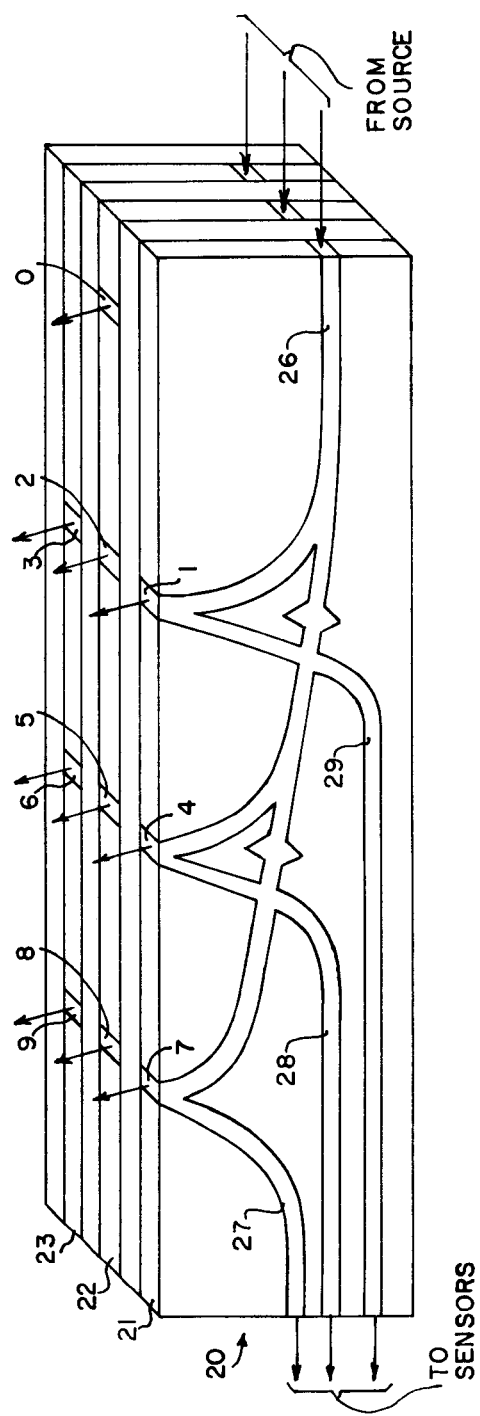
FIG. 4 illustrates how planar monolithic optical circuits can be formed, with intersecting conductors as required, and stacked to provide a keyboard with "keyholes" formed in the individual planar circuits thus formed and stacked.

The optical keyboards described in the aforesaid Evanchuk application can be inexpensively fabricated of a stack of optical circuits set on edge and laminated together; the laminations carrying all illuminating and sensing light conductors. The sensing junctions are at the short edge of the laminations and the keyholes are on the long edges forming the keyboard surface. The laminated optical circuits may be fabricated by molding, stamping, and the like, or by the photolithographic processes described in the aforesaid Evanchuk application. This stacking technique is illustrated in FIG. 4 and will now be described. Note that it takes advantage of the trapping technique described above, and that conductors cross, where crossing is necessary, at substantially 90°.

By fabricating the keyboard from a stack of optical monolithic circuits, all precision requirements necessary are met only once—in fabrication of the mask which is used to fabricate the laminated optical monolithic circuits. The planar circuits lend themselves to high-production automated techniques and will thus be less costly. A good mosaic can easily be fabricated by the assembly of a stack of optical monolithic circuits having a multiplicity of illuminating and/or sensing ports along one longer edge, which becomes the keyboard surface. But for simplicity, the ten-digit keyboard described in the aforesaid Evanchuk application will be described for fabrication using this technique of stacking planar optical circuits.

FIG. 4 is an isometric view of a typical keyboard 20 showing in elevation one of three monolithic optical circuits 21-23 stacked. Note that two (21 and 23) are identical; the middle (22) has four keyholes and therefore has three conductors crossing over. Each crossover has just ahead of it in the source conductor a trap as described with reference to FIG. 2, and each crossover is at substantially 90°, as described with reference to FIG. 1. Each of the circuits 21 and 23 thus has three keyholes, while circuit 22 has four keyholes, where source conductors meet the upper surface at an angle less than the critical angle of refraction and two light traps. Note that a single light conductor 26 on the right receives light from a source for distribution to the keyholes through branching conductors, but that separate sensing conductors 27, 28 and 29 are provided for the keyholes.

The light conductors may be coated by a reflective metal coating or clad with plastic of higher refractive index (or opaque plastic), but the ends of the conductors, or 'contact' pads, must be left open to light transmission. This could be done by a grinding/sanding operation after vacuum flashing of the metal coat, or by prior masking.

A substrate lies along the back surface of each circuit laminated for mechanical strength and to aid in the process during fabrication; also to provide desired spacing between rows of keyholes. If a high stacking factor is required, this substrate could be removed after fabrication by chemical or mechanical means. If molded, the substrate and the surrounding medium could form the mold into which the transparent medium of the light conductors is poured. In all cases there would be a final coating of reflecting metal or high-index material on the front and back surfaces of the conductors as well. The photolithographic methods of fabrication would probably be superior where high precision and fine conductors are required, being capable of making conductors of as small as a few micrometers in size, but for keyboards of only ten keyholes, molding would likely be the most effective fabrication technique to use.

The laminated circuits of FIG. 4 illustrate in front a circuit which would run vertically through the "1", "4" and "7" positions of a keyboard for a calculator, adding machine or telephone dial set. The illuminating light beam enters at the right edge and is distributed to all three positions, as shown. This causes an inevitable crossing over of at least two sensing lines. While the crossings could be made by the methods of the aforesaid Evanchuk application, yielding elevated, nonintersecting crossovers, the intersecting crossings 'at grade' shown in FIG. 3 would yield a thinner and less costly optical circuit by eliminating need for a second layer and all its fabrication steps. While there is some danger of crosstalk from these grade crossings, most of this can be eliminated by the traps shown in FIG. 2 or FIG. 3. If the sensors have a threshold level of actuation set higher than the remaining crosstalk level, there will be no problem from this source. The threshold can also take care of expected ambient light entering into the sensing lines. Filtering and/or synchronous modulating-/demodulating can also be used to eliminate ambient light problems. Normally these will not arise, for the light level in the conductors will usually be very high compared to the usual indoor ambient light. The light emitted from each sensing junction will be apparent to the operator, since it exists at an angle to the normal, as shown for keyholes "1", "4" and "7" by the arrows in FIG. 4. These lit areas can serve as locators, or targets, for the operator.

For a self-illuminated, changeable-type keyboard, a great number of illuminating points would be required. Most, if not all, would not have sensing lines, thus there would be few or no crossovers required. Each optical circuit of a stack would consist of a great many lines coming up to keyboard surface but without the junctions shown in FIG. 4. These can be fed from one illuminating bus, where only self-illumination is required. Separately switched lines are required where the changeable-type capability is desired.

The stack of optical circuits can be bonded together (laminated), or held by frames, bolts, and the like. The input/output devices can be located outside the laminated circuits, or incorporated on them. In the latter case they must be physically staggered to attain a high stacking factor. In simple keyboards the sensors (photodiodes, phototransistors, etc.) may be formed directly on the planar optical circuits, since stacking factors can be low. Their electrically conductive leads would be fabricated on the planar optical circuits by the usual techniques used for printed circuits.

Although particular embodiments of the invention have been described and illustrated herein, it is recognized that modifications and variations may readily occur to those skilled in the art. Consequently, it is intended that the claims be interpreted to cover such modifications and equivalents.

What is claimed is:

1. In a monolithic optical circuit, a planar crossover of two light conductors comprised of straight sections of the two conductors intersecting at as close to 90° as can be conveniently provided for the crossover, wherein each conductor section has cross section dimensions greater than 0.89λ at which diffraction may begin to take place at the opening of one section into the volume of intersection, where λ is the wavelength of source light used in said monolithic optical circuit, and including a light trap in a straight section of a conductor just ahead of the crossover for trapping source light being reflected from sides of said conductor at large angles, wherein said trap is comprised of triangular shaped portions in said straight section on at least two opposing sides, each triangular portion having a far side receiving incident source light at an angle equal to or less than 45° so that the incident light will be reflected to the other side of the triangular portion, whereby what would be the third side of the triangular portion is a window for light at large angles of reflection in said straight portion of said conductor.

2. The combination of claim 1 wherein said large angles are angles greater than about 45°.

3. In a monolithic optical circuit having an optical conductor adapted to receive light from a source and a plurality of sense optical conductors crossing said source conductor at an angle of approximately 90°, a light trap in said source conductor just ahead of each crossing sense conductor in a straight section of said source conductor for trapping source light being reflected from sides of said source conductor at large angles, wherein said source conductor branches into a number of conductors intersecting the side of said optical circuit at less than the critical angle of refraction so that illuminating source light passes out to the ambient atmosphere through an intersecting side area unless an object is placed directly over said area to cause light to be reflected, said number of branches being equal to a number of sensing conductors each of which intersects a different one of said source conductor branches at an intersecting side area, whereby each side area becomes an area where light may be selectively caused to be reflected into a sense conductor by placing an object over the area to reflect light into a sense conductor that would otherwise pass out.

4. The combination of claim 3 wherein said large angles are angles greater than about 45°.

5. The combination of claim 3 or 4 including a plurality of optical circuits stacked together to form a surface with an array of side areas where light may be selectively caused to be reflected into a sense conductor.

* * * * *